United States Patent [19]

Cassady, Jr. et al.

[11] Patent Number: 4,753,781

[45] Date of Patent: Jun. 28, 1988

[54] SOLID DETERGENT AND CHEMICAL DISPENSER

[75] Inventors: Henry W. Cassady, Jr., Santa Cruz; Gary D. Moreland, Watsonville, both of Calif.

[73] Assignee: Beta Technology, Inc., Santa Cruz, Calif.

[21] Appl. No.: 897,677

[22] Filed: Aug. 18, 1986

[51] Int. Cl.$^4$ ............................................. B01D 11/02
[52] U.S. Cl. .................................. 422/264; 222/190; 137/268; 210/198.1
[58] Field of Search ................... 422/261, 264, 264 B, 422/266, 274, 278; 210/198.1; 239/310; 222/190; 137/268

[56] References Cited

U.S. PATENT DOCUMENTS

| | | | |
|---|---|---|---|
| 3,416,897 | 12/1968 | Long et al. | 422/278 |
| 4,339,332 | 7/1982 | Jasperson | 210/198.1 |
| 4,426,362 | 1/1984 | Copeland et al. | 422/263 |

Primary Examiner—David L. Lacey
Attorney, Agent, or Firm—Flehr, Hohbach, Test, Albritton & Herbert

[57] ABSTRACT

A dispenser for safely dispensing solid block chemical compositions contained in jars. The jars have an orifice for exposing at least one surface of the solid block chemical therein. The dispenser has a housing defining a substantially enclosed inner cavity. A nozzle, mounted to extend into the cavity, directs a pressurized spray of liquid vertically upwards; while a discharge outlet mounted on the bottom of the cavity receives liquid from the cavity and directs the liquid out of the cavity.

A jar holder in the housing holds one solid block chemical jar with the jar's orifice facing downward. A door rotatably hinged to the housing provides access to the cavity for loading and unloading solid block chemical jars. The door has a range of movement including a closed position in which the cavity is substantially enclosed and an open position in which the jars can be loaded and unloaded.

A spray blocker is coupled to the door so that when the door is rotated from a closed position toward its open position, the spray blocker moves in front of the nozzle and substantially prevents liquid emanating from the nozzle from spraying through the opening in the cavity created by opening the door.

6 Claims, 3 Drawing Sheets

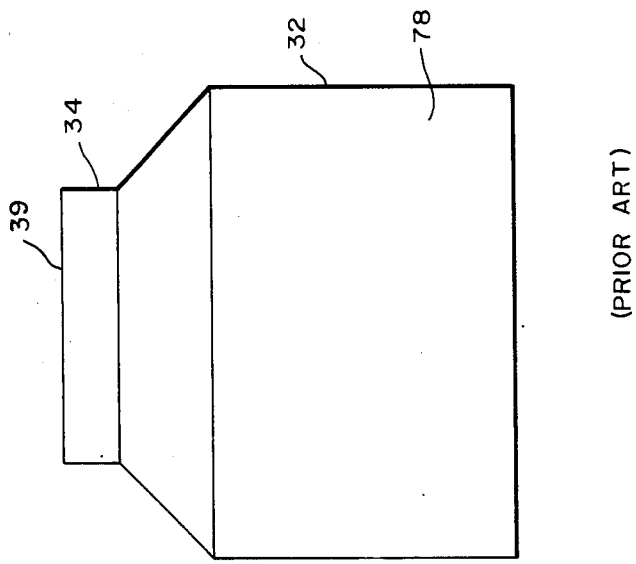
FIG.—2 (PRIOR ART)
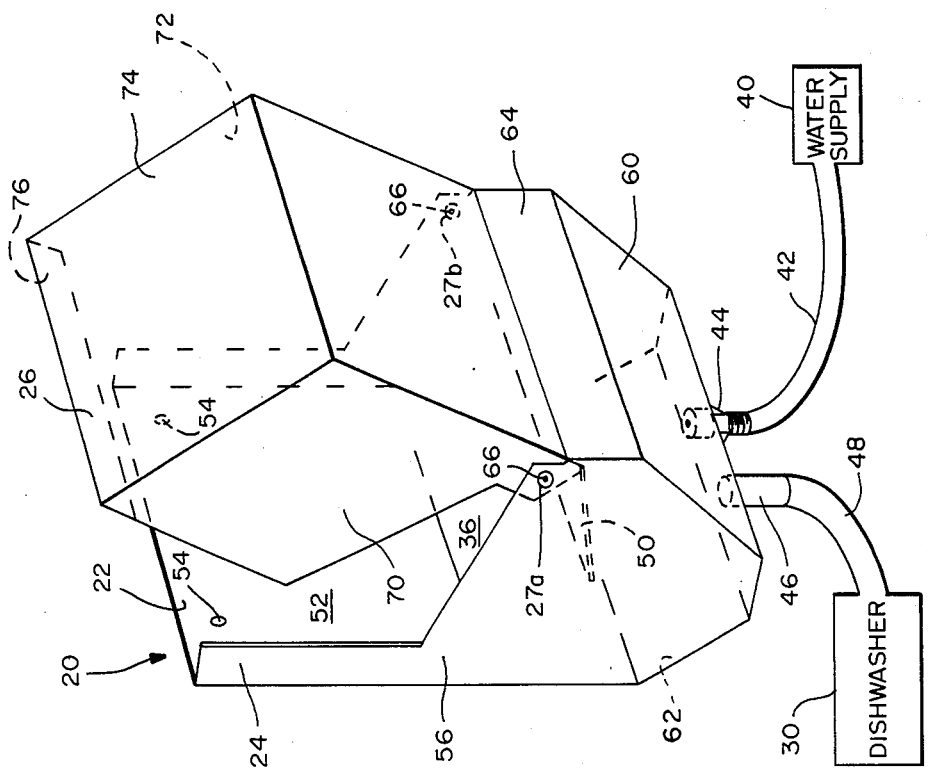
FIG.—1

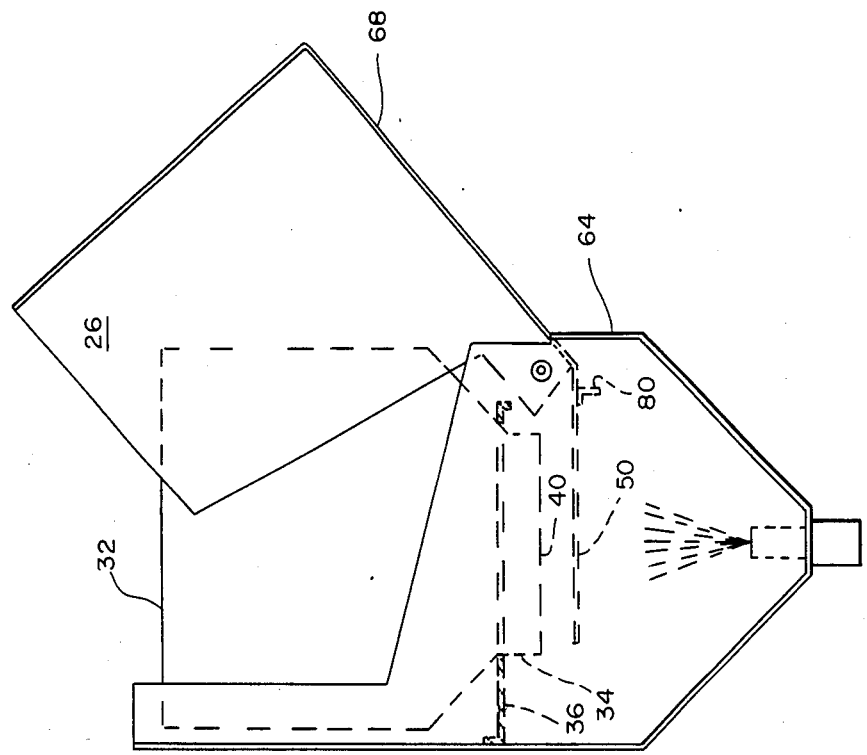
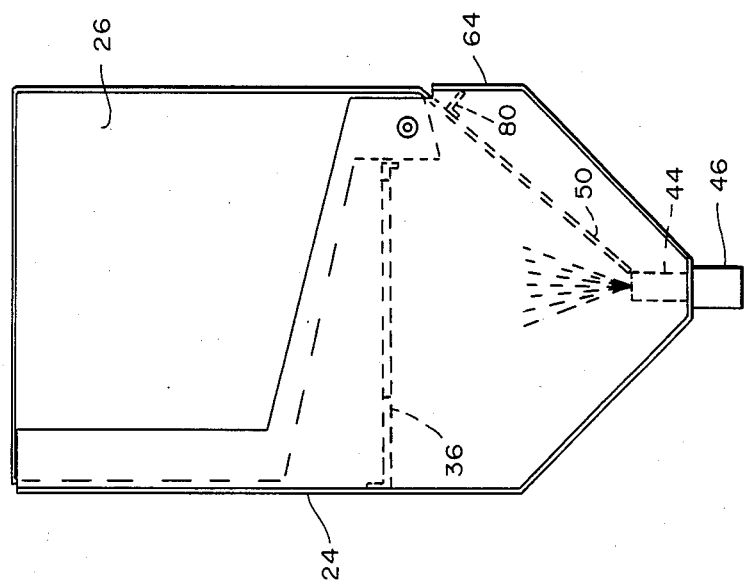
FIG.—3
FIG.—4

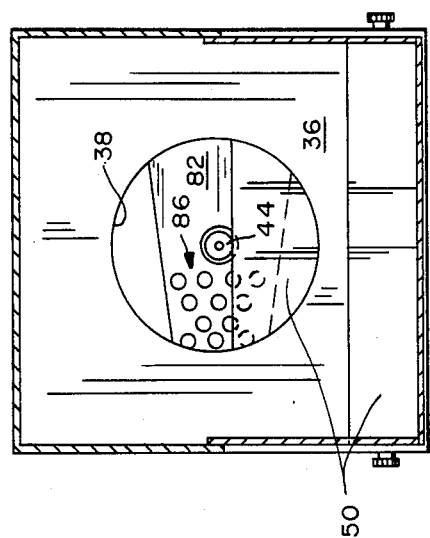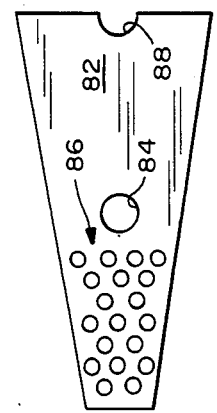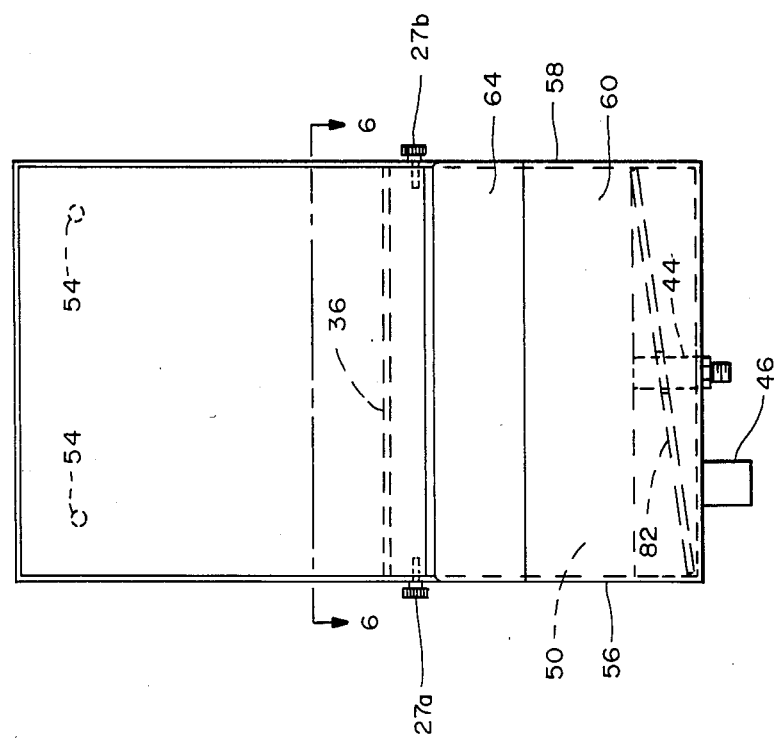

SOLID DETERGENT AND CHEMICAL DISPENSER

The present invention relates to a dispenser for solid detergents and chemicals.

BACKGROUND OF THE INVENTION

The industrial dishwasher industry has generally adopted the use of solid detergents, instead of the powdered detergents formerly used. The primary motivations for this change were (1) solid detergents can be made twice as concentrated as powdered detergent, and can therefore reduce detergent shipping costs; and (2) dispensers for solid detergents should, at least theoretically, be mechanically simpler in design and therefore more reliable than those for powdered detergents.

As it has turned out, however, there have been more problems with solid chemical dispensers than originally anticipated. Practically all these problems are related to the use of a nozzle spray of water to dissolve the solid detergent, which is generally held in a plastic jar with an orifice facing the water nozzle.

More particularly, it is important for safety reasons that the dispenser prevent the user from being sprayed with water when the supply of solid detergent is replaced. In other words, it is highly undesirable to have either the user or the dispenser's surroundings sprayed with water and the caustic chemicals dissolved by the water. It is also important that the dispenser be designed to make it easy to replace detergent jars, but difficult to incorrectly place the jar in the dispenser.

In some prior art dispensers, a water deactivation switch is included in the dispenser so that water cannot flow into the dispenser unless a detergent jar is properly seated in the device. While this feature appears desirable from the safety viewpoint, it has turned out to be the source of many problems because these switches and the associated wires are vulnerable to malfunctions. These malfunctions have typically been caused by water induced corrosion, water induced short circuits, and a variety of mechanical failures due to use in industrial settings.

Another problem with some prior art dispensers is that they require the detergent dispenser jar to be threaded onto or into the dispenser. This feature, or fault, results in water and detergent leakage if the jar is not properly threaded onto the dispenser. In other words, the reliability of these dispensers depends on the conscientiousness of the users.

The present invention solves the problems with the above discussed prior art dispensers through the use of a simple mechanical design which includes only one single moving part (the dispenser's hinged door). When the user replaces a detergent jar, the user must open a door which provides access to the detergent jar. This door is coupled to, and preferably made from the same piece of metal or plastic as a plate which automatically blocks the spray of water from the dispenser's water nozzle. It is the purpose of this plate to make it impossible for water to spray out of the dispenser regardless of the angle at which the dispenser's door is held.

In addition, in the present invention the detergent jar is seated on a simple orifice which requires no threading. The dispenser and orifice are shaped so that the dispenser jar automatically falls into a functionally acceptable position and which makes it impossible to close the dispenser door if the jar is somehow not properly seated.

The major advantages of the present invention are its simplicity, built in safeness, and foolproof design.

As an aside, the inventors note that while the present invention is designed especially for dispensing solid block chemicals, the invention is also useable with jars of powdered chemicals where the jar's orifice is covered with a screen. The screen prevents the powdered chemical in the jar from falling out of the jar undissolved. The powder is dispensed only as it is dissolved—and thus acts much like a solid block chemical.

It is therefore a primary object of the present invention to provide an improved solid detergent and chemical dispenser which uses a simple mechanical design to prevent water from the dispenser's nozzle from spraying the user of the dispenser.

Another object of the present invention is to provide a dispenser which makes it easy and safe to replace the supply of detergent or chemical in the dispenser.

SUMMARY OF THE INVENTION

In summary, the present invention is a dispenser for safely dispensing solid block chemical compositions contained in jars. The jars have an orifice for exposing at least one surface of the solid block chemical therein. The dispenser has a housing defining a substantially enclosed inner cavity. A nozzle, mounted to extend into the cavity, directs a pressurized spray of liquid vertically upwards, while a discharge outlet mounted on the bottom of the cavity receives liquid from the cavity and directs the liquid out of the cavity.

A jar holder in the housing holds one solid block chemical jar with the jar's orifice facing downward. A door rotatably hinged to the housing provides access to the cavity for loading and unloading solid block chemical jars. The door has a range of movement including a closed position in which the cavity is substantially enclosed and an open position in which the jars can be loaded and unloaded.

A spray blocker is coupled to the door so that when the door is rotated from a closed position toward its open position, the spray blocker moves in front of the nozzle and substantially prevents liquid emanating from the nozzle from spraying through the opening in the cavity created by opening the door.

BRIEF DESCRIPTION OF THE DRAWINGS

Additional objects and features of the invention will be more readily apparent from the following detailed description and appended claims when taken in conjunction with the drawings, in which:

FIG. 1 is a perspective view of the preferred embodiment of the present invention.

FIG. 2 is an elevation view of a typical jar used to hold solid detergent.

FIG. 3 is a side elevation view of a dispenser with its door closed.

FIG. 4 is a side elevation view of the dispenser shown in FIG. 3 with its door open.

FIG. 5 is a front elevation view of the dispenser shown in FIG. 3.

FIG. 6 is the section view taken along line 6—6 in FIG. 5.

FIG. 7 is a plan view of a grate used in the preferred embodiment.

DESCRIPTION OF THE PREFERRED EMBODIMENT

Referring to FIG. 1, there is shown a perspective view of the preferred embodiment of a dispenser 20 in accordance with the present invention. The dispenser's primary component is its housing 22, which includes a base member 24 and a door 26. The door is hinged to the base 24 by two pins or screws 27a and 27b. When the door 26 is closed, the housing 22 forms a substantially closed cavity.

The purpose of the dispenser 20 is to dispense detergent to a dishwasher 30. In other embodiments of the invention the dispenser could be used to dispense other chemical compositions for other types of systems.

In the preferred embodiment, a jar 32 of solid detergent, such as the one depicted in FIG. 2, is placed upside down in the cavity with the jar's neck 34 extending through an aperture 38 (see FIG. 6) in supporting plate 36. Naturally, the jar is uncovered before it is placed in the dispenser so that the detergent therein is exposed through the orifice 39 at the end of the jar's neck 34.

Water from a water supply 40 flows through a supply line 42 to a nozzle 44 in the bottom of the housing 22. From there the water sprays upward into the open orifice 40 of the jar. The detergent in the jar 32 is dissolved by the water, which flows out of the dispenser through a discharge tube 46. In the preferred embodiment, the discharge tube 46 is connected to the detergent feed line 48 for a dishwasher 30.

A spray blocking plate 50 is rigidly coupled to the door 26. When the door 26 is closed, the dispenser's cavity is substantially closed and the plate 50 does not affect the spray from the nozzle 44. When the door 26 is rotated from a closed posiiton to an open position, the spray blocking plate 50 moves in between the nozzle and the jar 32, preventing the spray from reaching either the jar 32 or the opening in the housing 22 created by opening the door 26.

If the door 26 is closed, but there is no jar in the housing 22, then the spray from the nozzle 44 will be contained within the dispenser's cavity because the cavity is closed on all sides.

Still referring to FIG. 1, the housing base member 24 includes a back wall 52 with two or more holes 54 for mounting the dispenser on a rigid vertical surface, side panels 56 and 58, front and back slanting panels 60 and 62, and front panel 64. The side panels 56 and 58 each have a hole 66 for accepting a pin or screw for mounting the door 26 on the base 24.

The door 26 includes a front panel 68, side panels 70 and 72, a top panel 74, and a back sealing panel 76 which helps make the dispenser's cavity substantially closed when the door 26 is closed. Although not shown in the Figures, on the interior side of the door's side panels 70 and 72 there are bolts with threaded holes positioned to receive screws inserted through the holes 66 in the housing side panels 56 and 58. These screws and bolts form the hinges for the door 26.

FIG. 2 is an elevation view of a typical jar used to hold solid detergent. The preferred embodiment is shaped to accept detergent jars of several different shapes, made by different manufacturers. Referring to FIG. 6, the aperture 38 in support plate 36 is sized so that the neck 34, but not the main body 78, of all the different detergent jars fit through the aperture 38. The dispenser's cavity is also shaped to provide very little more room than that occupied by the detergent jar, so that the housing door 26 cannot be closed unless the detergent jar is properly seated in the dispenser 20.

FIG. 3 is a side elevation view of the dispenser 20 shown in FIG. 1 with its door 26 closed. As shown, the spray blocking plate 50 does not block the nozzle's spray. Also, there is a seating member 80 attached to the lower side of the spray blocking plate 50 which contacts, or comes close to contacting, front plate 64 of the base 24 when the door 26 is closed.

FIG. 4 is a side elevation view of the dispenser 20 shown in FIG. 1 with its door 26 open. A jar 32 is shown seated upside down on support plate 36. The door's range of movement is limited by the angle at which the front plate 68 of the door 26 contacts the front plate 64 of the base 24. The door 26 and base 24 are designed so that detergent jars can be easily removed from and placed into the dispenser 20 when the door 26 is in its fully open position. The door 26, however, stops before the spray blocking plate 50 hits the support plate 36.

FIG. 5 is a front elevation view of the dispenser 20 shown in FIG. 3, with the door 26 removed. At the bottom of the dispenser there is a grate 82 which prevents chunks of solid detergent which fall from the jar 32 from clogging or going through the discharge tube 46 undissolved. The grate 82 slopes downward from the right side panel 58 toward the discharge tube 46. This slope helps any chunks of solid detergent which fall on the grate 82 to migrate toward the discharge tube 46.

As shown in FIG. 7, the grate 82 is a trapezoid shaped plate having an aperture 84 for receiving the nozzle 44 in the dispenser. The trapezoid shape causes the grate to sit on the sloped walls 60 and 62 of the housing base 24 at an angle as shown in FIG. 5. The end of the grate 82 covering the discharge tube 46 is perforated with an array of holes 86. These holes, which are about 1/16 inch in diameter, limit the size of undissolved chunks of detergent which can escape from the dispenser through the discharge tube 46. In the preferred embodiment, the grate has a semicircular thumb hole 88 at the base of the trapezoid to facilitate placement and removal of the grate 82 from the dispenser 20.

FIG. 6 is the section view noted in FIG. 5. The support plate 36, which is shaded in FIG. 6, has an aperture 38, below which lies the nozzle 44 and the grate 82. In the view shown, the view of the grate 82 is partially blocked by the spray blocking plate 50.

In the preferred embodiment, all of the components of the dispenser are made of stainless steel, with 1/16 inch sheet metal being used for the housing 22. In other embodiments, the dispenser's housing 22 could be made from plastic so long as the plastic used did not react with the chemical being dispensed.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A dispenser for safely dispensing solid block chemical compositions contained in jars with an orifice for exposing at least one surface of a solid block, comprising:

a housing defining a substantially enclosed inner cavity; said housing including door means rotatably hinged to said housing for providing access to said cavity for loading and unloading solid block chemical jars, said door means having a range of movement including a closed position in which said cavity is substantially enclosed and an open position in which jars can be loaded and unloaded;

nozzle means extending into said cavity for directing a pressurized spray of liquid vertically upwards;

discharge means mounted in the bottom of said housing to receive liquid from said cavity and to direct the liquid out of said cavity;

jar supporting means in said housing for holding a solid block chemical jar with the jar's orifice facing downward; and spray blocking means coupled to said door means so that when said door means is rotated from said closed position toward said open position, said spray blocking means moves in front of said nozzle means and substantially prevents liquid emanating from said nozzle means from spraying through the opening in said cavity created by opening said door means.

2. The dispenser of claim 1, wherein
said spray blocking means is a flat plate rigidly mounted to said door means.

3. The dispenser of claim 1, wherein
said jar supporting means includes an aperture of a fixed size so that a jar with a neck narrower than said aperture and a main body wider than said aperture can be loaded into said dispenser by placing the jar on said jar supporting means with the jar's neck extending through said aperture.

4. The dispenser of claim 1, further including
a grate overlying said discharge means which substantially prevents chunks of solid block chemical which fall from a jar from clogging or going through said discharge means undissolved.

5. A dispenser for safely dispensing chemical compositions contained in jars having a main body and a neck with an orifice at the end thereof, comprising:

a housing defining a substantially enclosed inner cavity; said housing including a base configured for fixed mounting to a solid surface; and door means rotatably hinged to said base for providing access to said cavity for loading and unloading jars of chemicals, said door means having a range of movement including a closed position in which said cavity is substantially enclosed and an open position in which jars can be loaded and unloaded;

nozzle means mounted to extend into said cavity for directing a pressurized spray of liquid vertically upwards;

discharge means mounted in the bottom of said housing to receive liquid from said cavity and to direct the liquid out of said cavity; and jar supporting means in said housing for holding a jar with the jar's orifice facing downward; and spray blocking means coupled to said door means so that when said door means is rotated from said closed position toward said open position, said spray blocking means moves in front of said nozzle means and substantially prevents liquid emanating from said nozzle means from spraying through the opening in said cavity created by opening said door means.

6. The dispenser of claim 5,
wherein said dispenser is adapted for use with a jar containing a solid block chemical composition;
said dispenser further including
a grate overlying said discharge means which prevents chunks of solid block chemical which fall from a jar from going through said discharge means until said chunks are at least partially dissolved by the liquid from said nozzle and are thereby reduced to be no larger than a predetermined size.

* * * * *